United States Patent [19]
King

[11] 3,924,640
[45] Dec. 9, 1975

[54] IMPLANTABLE ELECTRICALLY POWERED MEDICAL DEVICE

[75] Inventor: Wendell L. King, Isanti, Minn.

[73] Assignee: Medtronic, Inc., Mpls., Minn.

[22] Filed: July 15, 1974

[21] Appl. No.: 488,524

[52] U.S. Cl............................................. 128/419 P
[51] Int. Cl.²........................................... A61N 1/36
[58] Field of Search .... 128/1 R, 405, 419 C, 419 E, 128/419 R, 421, 422, 419 P, 419 PS; 136/144, 151, 152, 166, 177, 179; 29/613

[56] References Cited
UNITED STATES PATENTS

| | | | |
|---|---|---|---|
| 3,244,174 | 4/1966 | Wesbey et al.................. | 128/419 P |
| 3,690,325 | 9/1972 | Kenny........................... | 128/419 P |
| 3,757,793 | 9/1973 | Fester............................ | 128/419 PS |
| 3,842,842 | 10/1974 | Kenny et al..................... | 128/419 P |

Primary Examiner—William E. Kamm
Attorney, Agent, or Firm—Schroeder Siegfried Ryan & Vidas

[57] ABSTRACT

An implantable electrically operated medical device, such as a pacemaker, having one or more electrochemical cells and operative electric circuitry mounted in an encapsulated covering of epoxy resin which is impermeable to body fluids. The electrochemical cells generate a hydrogen gas and the encapsulated covering, while being relatively impermeable to hydrogen gas is capable of passing the gas through at a relatively low permeation rate. Buildup in pressures within the encapsulant occur under increased hydrogen evolution rates from the electrochemical cells and the improved device modifies the shape of the electrochemical cells and reinforces the epoxy resin encapsulant over the corners of the cells to strengthen the encapsulant covering and increase the burst strength of the device.

3 Claims, 6 Drawing Figures

U.S. Patent   Dec. 9, 1975   3,924,640
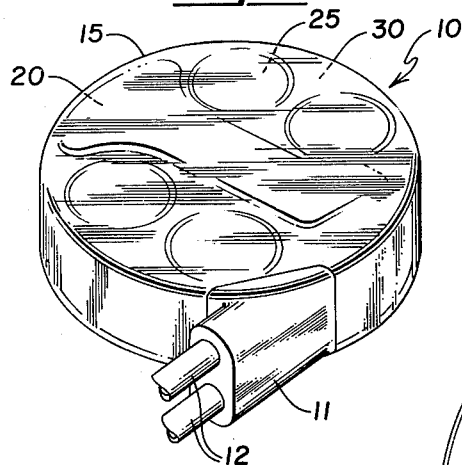
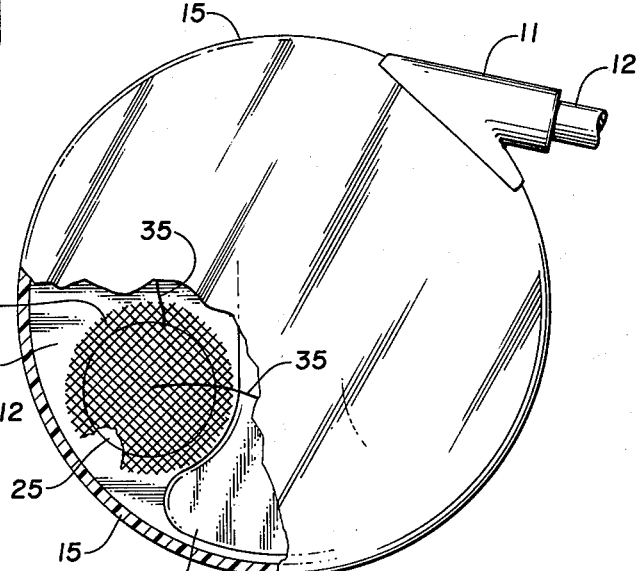
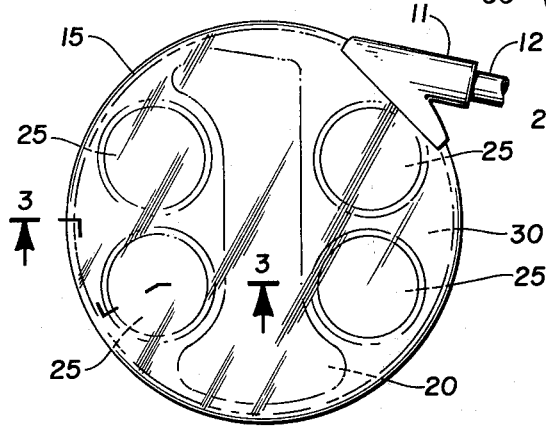
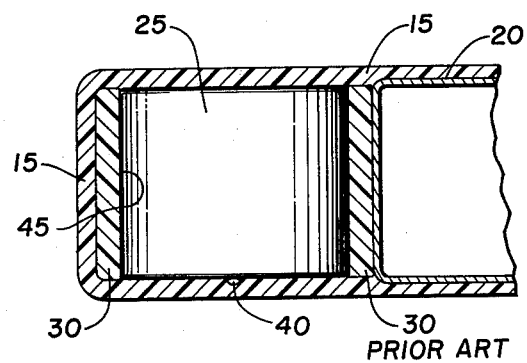
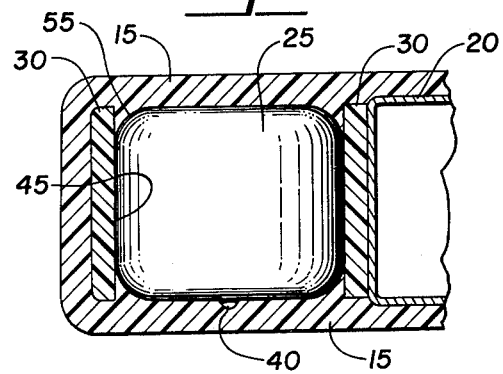
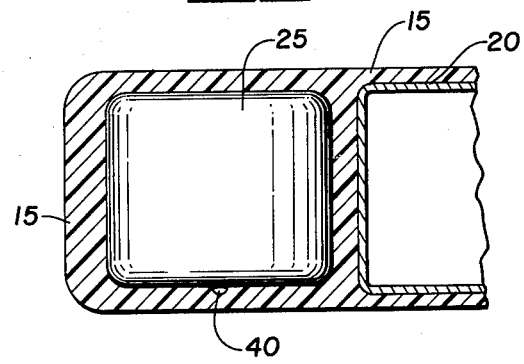

IMPLANTABLE ELECTRICALLY POWERED MEDICAL DEVICE

My invention relates to an improved, implantable electrically powered medical device, such as a cardiac pacer, and more particularly to an improvement in a device of this type to minimize internal stress on the device and to strengthen the same.

Implantable electrically powered medical devices are normally powered from electrical energy derived from one or more electrochemical cells or batteries, usually of the alkaline, zinc mercury type. Such devices are encapsulated in an epoxy resin which is body tissue compatible and is relatively impermeable to body fluids. However, such materials are also relatively impermeable to hydrogen gas. The encapsulant material or the choice of the same is limited to the materials which are stable in body fluids and compatible with the same so as to be non-irritating and bacteriostatic. With such a liquid tight sealed unit or device, one of the problems is that of gas evolution from the electrochemical cells within the device. Under certain conditions, gas evoltuion creates excessive pressure buildup and results in fracturing of the encapsulant which encase the device. Present day implantable devices, in particularly pacemakers, contain electrochemical batteries as power sources which emit hydrogen gas during their discharge. During normal functioning, the hydrogen gas is generated at a slow rate and is vented from the electrochemical cells and permeates through the relatively impermeable epoxy resin encapsulant. What results is a relatively small pressure buildup within the encapsulation under the normal conditions. However, in unusual cases, where the battery malfunctions or short circuits occur, the power source can generate relatively large quantities of hydrogen gas over a short time period. Such larger quantity hydrogen gas generated over a short time period is unable to permeate through the epoxy resin encapsulant at a rate as fast as it is generated as the rate is determined by the hydrogen permeability of the material, and the thickness of the same, therefore, relatively large pressure buildups will occur within the encapsulant. The epoxy resin encapsulants surrounding the electrochemical cells must withstand the pressure to maintain package or device integrity. Were the device to lose its liquid seal, the presence of body fluids would cause premature deterioration of the cells as well as have an adverse effect on the electrical circuitry therein. More importantly, the possible adverse effects upon body tissue with the loss of integrity of the casing are of greater importance.

In the present invention, the implantable electrical medical device has been improved to minimize internal stress on the encapsulation and to strengthen the overall device. It has been found that the maximum stress areas appearing on the encapsulant are in proximity with the sharp edges of the electrochemical cell. With the present invention, the cells have been redesigned to increase the radius of curvature of the corners thereof to significantly reduce the stress areas and increase the overall strength of package. In addition, reinforcement of the encapsulant through special mesh applied to the encapsulant and at the curved surfaces of the cell exposed to the encapsulant and similarly, at the edges of the electronic circuitry enclosed in a can within the device will diffuse internal stress at such points and strengthen the encapsulant to increase the burst strength of the device and improve the integrity of the same.

It is therefore the principle object of this invention to provide an improved implantable electrical medical device in which cell shape and encapsulant covering over the same together with reinforcement of the encapsulant strengthens the device and increases the internal burst strength of the same.

These and other objects of the invention will become apparent from reading of the attached description, together with the drawings wherein:

FIG. 1 is a perspective view of an implantable electrical medical device;

FIG. 2 is a plan view of the device;

FIG. 3 is a sectional view of the device of FIG. 2 taken along the lines 3-3 therein and showing a prior construction of parts for the same;

FIG. 4 is a sectional view similar to FIG. 3 and showing an improved relationship of parts for the device forming the invention herein;

FIG. 5 is a plan view of the device similar to FIG. 2 with parts broken away and showing another embodiment of the invention; and, FIG. 6 is a sectional view similar to FIGS. 3 and 4 showing a further embodiment of the invention.

As set forth in FIG. 1, the implantable electrically operated medical device is generally cylindrical in form, as indicated at 10, and has a connector member 11 attached thereto shielding output leads, indicated generally at 12, which in the case of the pacemaker, will extend to appropriate electrodes in a conventional manner. The device 10 is covered with a layer of epoxy resin 15, as will be best seen in the views of FIGS. 2 - 5 and incorporates electric circuitry or device, the details of which are omitted, mounted in a sealed container 20, which is generally tin or nickel plated for ease of soldering and as a water seal. The device is powered by one or more electrochemical cells of the alkaline mercury type, indicated at 25, and in one form of the embodiment, the device and cells are mounted in a spacer member 30 which may be made of a thermoplastic material which has higher permeability to hydrogen gas than does the epoxy resin coating. The cells powering the device are interconnected to one another and to the device, as indicated by the electrical connections 35, in FIG. 5, and suitable lead connections not shown, extend therefrom to the shielded output leads 12.

The electrochemical cells or alkaline mercury type cells generate or emit a hydrogen gas during the discharge which gas is vented through a vent extremity 40 of the cell and will normally permeate through the epoxy resin encapsulant material 15. Because there is a tendency of the epoxy metal bond to part and provide a very small volume space along the interface between the epoxy and the cell, there is a large area over which the gas pressure is applied increasing the tendency of rupturing of the epoxy covering. Because of epoxy resin material is relatively impermeable to the hydrogen gas, a rapid venting of gas in any quantity will create a buildup in pressure within the device and beneath the encapsulant applying forces to the same. The encapsulant material must have characteristics not only to be stable in body fluids, but should be compatable with body tissue, non-irritating and bacteriostatic. Similarly, it must bond well with the mounting member which will preferably be an injection molded polyphenelyne oxide/polystyrene commercially available under the mark NORYL, manufactured by the General Electric Company.

While the normal functioning of the electrochemical cells results in a relatively low evolution rate for the hydrogen gas from the same, the ability of the encapsulant material is such as to permeate the hydrogen gas and maintain relatively small pressure buildups within the encapsulant. However, in unusual cases where the battery malfunctions or short circuits, the power source can generate relatively large quantities of hydrogen over short time periods. Under these conditions, the hydrogen gas is unable to permeate through the epoxy resin encapsulant material at a rate sufficient to maintain a low equilibrium pressure within the device and a very large pressure will result. In order to insure the integrity of the device, the epoxy encapsulant surrounding the cell must withstand the increased pressure while the hydrogen defuses through the encapsulant. The factors affecting pressure buildup include the hydrogen permeation rate of the epoxy resin material, and the rate of discharge of the hydrogen gas from the cells. The burst strength of the device is affected by characteristics of the encapsulants and shape of the cells, as to be hereinafter defined.

It has been found that increasing the thickness of the encapsulant coating does not increase the burst strength safety factor significantly. However, the electrochemical cells are normally constructed so that the lower can shaped electrode has a very sharp radius of curvature at the lower edge thereof and at the juncture of the top where the inner and opposite electrode joins the seal with the lower electrode.

This is indicated in the prior art construction of FIG. 5, a similar sharp radius of curvature in the covering provides a shear force on the encapsulant material with an increase in pressure therein caused by hydrogen gas generation tending to cause cracks in the encapsulant covering. The radius of the curvature in the present day cells is from essentially zero to approximately 1/8 inch radius and typically about 1/32 inch radius. By redesigning the electrochemical cells or the electrodes thereof, to increase the radius of the curvature at the upper and lower ends thereof, where the encapsulant material surrounds the cells in the mounting member, or as to be hereinafter defined without the mounting member, the significant increase in burst strength of the epoxy coverage is obtained. Thus, I have found that a radius of curvature from 1/8 inch to 1/4 inch at these extremities significantly increases the burst strength of the encapsulant material and hence, the device.

As shown in FIG. 4, the radius of curvature of the lower electrode as indicated at 55 when the cells are positioned in the recesses 45 in mounting member 30, he encapsulant material surrounds the same on the sides and top and bottom will increase the burst strength of the device by a factor of three.

As indicated in FIG. 5, a glass or metal mesh reinforcement 60 positioned in the epoxy encapsulant material and overlying the curved edges of the cell similarly increases the burst strength of the same over the unreinforced value. When such reinforcement is used strength improvement is in the area of approximately 1.5 times the unreinforced value. With encapsulant coatings varying from 0.040 to 0.140 of an inch overlying the mounting member and the cells and electric device therein including the mounting member supporting the same, a resultant increase in burst strength of the device is thereby achieved. As indicated in FIG. 5, the mesh 60 may be used with or without the increased radius of the curvature to achieve the result of fiber reinforcement.

As indicated in FIG. 6, the electrically operated medical device may be encapsulated without the use of the spacer member in which the cells and device are covered with the encapsulant material to achieve the same effects as obtained in FIGS. 4 and 5 through the use of the increased radius of curvature of the cell or the reinforcement material.

Therefore, in considering this invention, it should be remembered that the present disclosure is illustrative only and the scope of the invention should be determined by the appended claims.

What I claim is:

1. An implantable electrically powered medical device comprising: at least one generally cylindrically shaped electrochemical cell of a type which has hydrogen gas emitted during discharge thereof, an electric pulse generator including electrode members extending therefrom, a mounting member having recessed therethrough for positioning said cell and said pulse generator, an encapsulant covering the epoxy resin material positioned over the mounting member with said cell and pulse generator therein, and with the electrode members extending through the mounting member, the encapsulant covering having a thickness over the top and bottom of the cell in the mounting member from 0.040 to 0.140 inches and the radius of curvature of said cells at the top and bottom edges of the same being from greater than 1/8 inch to about 1/4 inch and a mesh material positioned in the encapsulant covering over the top and bottom of the cell at at least the edges of the same.

2. The implantable electrically powered medical device of claim 1 in which the mesh material is a metallic mesh material.

3. The implantable electrically powered medical device of claim 1 in which the mesh material is a glass mesh material.

\* \* \* \* \*